A. LARSEN.
HOOF PAD.
APPLICATION FILED APR. 5, 1913.
1,135,030.
Patented Apr. 13, 1915.
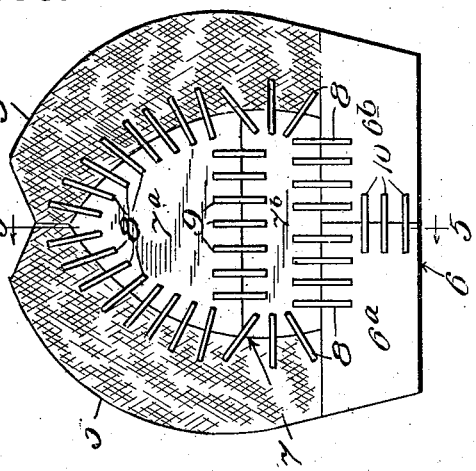
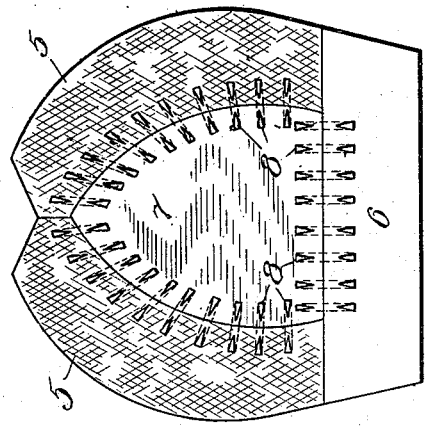
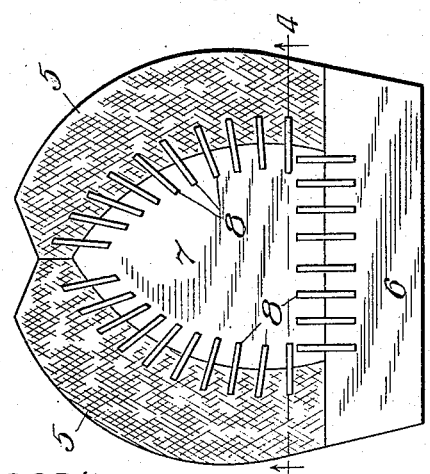
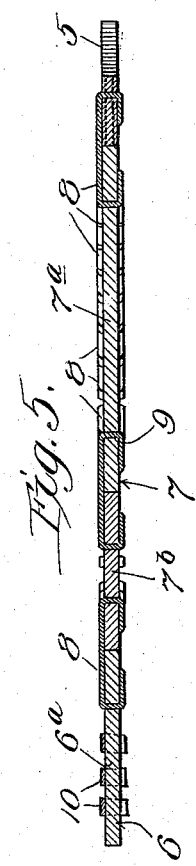
Witnesses:
Inventor:
Andru Larsen
by Poole & Cromer
Attys

UNITED STATES PATENT OFFICE.

ANDRU LARSEN, OF CHICAGO, ILLINOIS.

HOOF-PAD.

1,135,030.  Specification of Letters Patent.  Patented Apr. 13, 1915.

Application filed April 5, 1913. Serial No. 759,003.

*To all whom it may concern:*

Be it known that I, ANDRU LARSEN, a citizen of the United States, and a resident of Chicago, in the county of Cook and State of Illinois, have invented certain new and useful Improvements in Hoof-Pads; and I do hereby declare that the following is a full, clear, and exact description thereof, reference being had to the accompanying drawings, and to the letters of reference marked thereon, which form a part of this specification.

This invention relates to hoof pads adapted for insertion between the horse shoe and the hoof of the horse, of that class comprising a rim member of flexible material and conforming generally to the shape of the shoe, and a center member joined at its margins to the rim member and adapted to cover or protect the frog and central parts of the hoof.

A hoof pad embodying my invention has its center member made of leather and arranged in the same plane with the rim member and has the portion of said rim member, which is inserted between the shoe and hoof, made of flexible fabric, consisting of layers of cloth joined by adhesive waterproof material, such for instance, as the rubber fabric commonly used for belting. A hoof pad thus made has the advantage of possessing a desired degree of flexibility both in its rim and center members, by which it is adapted to readily conform to the irregularities of the shoe and the surface of the hoof to which it is applied, while the rim member, made of rubber fabric or the like, has a degree of elasticity, giving the desired cushioning effect, and the leather center member possesses such degree of strength, durability and stiffness as to properly protect the parts of the hoof covered thereby.

The invention consists in the matters hereinafter described and pointed out in the appended claims.

As shown in the accompanying drawings—Figure 1 is a face view of the hoof pad embodying my invention; Fig. 2 is a view of the opposite side of the pad shown in Fig. 1; Fig. 3 in a face view of the pad, like those shown in Figs. 1 and 2, wherein the center member and heel member are made up of a plurality of parts or pieces joined at their meeting margins; Fig. 4 is a sectional view, taken upon line 4—4 of Fig. 1. Fig. 5 is a sectional view, taken upon line 5—5 of Fig. 3.

Referring to the form of pad shown in Figs. 1, 2 and 4, the same consists of two laterally curved rim members 5, 5, a transversely extending heel member 6, and a center member 7. The lateral rim members 5, 5 are made of fabric consisting of two layers of cloth or canvas united by rubber or other waterproof, adhesive material. The heel member 6 and center member 7 are made of leather. The said rim members 5, 5, the heel member 6 and the center member 7 are arranged in the same plane, with their meeting edges in abutting relation. For joining the center member to the rim members and heel member, I employ a plurality of metal fasteners or staples 8, 8, 8, the body portions of which extend across the meeting edges of the joined parts, and the points or prongs of which are inserted through the said members from one side thereof and clenched on the other side thereof.

In the construction shown in Fig. 3, the center member 7 consists of a plurality of pieces or sections of leather joined to each other in the same plane with their meeting edges in abutting relation. As shown in said Fig. 3, said center member 7 consists of two pieces or sections 7ª, 7ᵇ. These pieces or sections are joined by means of staples 9, 9, which extend across the meeting edges of the sections and have their prongs or points inserted through said sections and clenched thereon, as before described. As shown in said Fig. 3, moreover, the heel section 6 consists of a plurality of pieces or sections of leather, two of which 6ª, 6ᵇ, are shown in the drawing. Said sections 6ª, 6ᵇ, meet each other edge to edge, and are joined by a plurality of metal fasteners or staples 10, 10, arranged as before described.

From the above, it will be understood that in a horse shoe pad embodying my present invention, the rim of the pad, or that part coming between the hoof and the shoe is made of fabric of the character described, while the center member and heel member are made of leather. The use of such fabric for the rim portion of the pad has the advantage of giving the desired cushion between the shoe and the hoof, while at the same time such rim portion can be made of large pieces of such fabric at a much less expense than would be involved in the use of corresponding pieces of like size made of suitably thick leather. By making the center member of leather and arranging it in the same plane with the rim portion, said center member is made of sufficient stiffness and durability to properly protect the central part of the hoof, while at the same time the entire pad is given a degree of flexibility permitting it to adjust itself to the shape of the contacting surfaces of the hoof and shoe and to conform to any irregularities in these parts. The transverse heel piece is desirably made of leather, in order that it may have the necessary durability under the hammering action thereon of the rear ends of the shoe, which are unattached to the heel portion of the hoof.

The center member and heel member, when made of leather, as described, will not be unduly expensive, because they do not require large pieces of leather for their construction. As a further improvement, however, I make the said center member, and heel member of a plurality of pieces or sections, permanently joined or united at their meeting edges by metal fasteners or staples.

Inasmuch as the parts of a pad made as described, may be variously modified with respect to the form of the same, I do not desire to be limited to the particular details of construction shown in the accompanying drawings, except as pointed out in the appended claims.

I claim as my invention:

1. A hoof pad adapted to be interposed between the hoof of a horse and the shoe, said pad comprising a curved rim member of the general contour of the shoe, said rim member consisting of a plurality of layers of cloth united to each other by an adhesive, water-proof material, a center member made of leather and having its lateral edges meeting and in abutting relation with the inner lateral edges of said rim member; all portions of said center member lying in the same plane with said rim member, and metal fasteners for securing said rim and center members together.

2. A hoof pad adapted to be interposed between the hoof of a horse and a shoe, said pad comprising a curved rim member of the general contour of the shoe, said rim member consisting of a plurality of layers of cloth united to each other by an adhesive, waterproof material, a center member having its lateral edges meeting and in abutting relation with the inner lateral edges of said rim member, a transverse heel member having its inner longitudinal edge meeting and in abutting relation with the adjacent edges of said rim and center members, said center and heel members, each being made of leather, all portions of said center and heel members lying in the same plane with said rim member, and metal fasteners for securing said rim, center and heel members together.

3. A hoof pad adapted to be interposed between the hoof of a horse and a shoe, said pad comprising a curved rim member of the general contour of the shoe, said rim member consisting of a plurality of layers of cloth united to each other by an adhesive, water-proof material, a center member having its lateral edges meeting and in abutting relation with the inner lateral edges of said rim member, a transverse heel member having its inner longitudinal edge meeting and in abutting relation with the adjacent edges of said rim and center members, said center and heel members each being made of leather; one of the last two mentioned members consisting of a plurality of pieces or sections which meet each other edge to edge, metal fasteners inserted through and uniting said pieces or sections and all portions of said center and heel members lying in the same plane with said rim member, and metal fasteners for securing said rim, center and heel members together.

In testimony that I claim the foregoing as my invention I affix my signature in the presence of two witnesses, this 31st day of March, A. D. 1913.

ANDRU LARSEN.

Witnesses:
EUGENE C. WANN,
M. F. ANTHONY.

Copies of this patent may be obtained for five cents each, by addressing the "Commissioner of Patents, Washington, D. C."